United States Patent
Kounosu (10) Patent No.: US 12,056,868 B2
(45) Date of Patent: Aug. 6, 2024

(54) IMAGE PROCESSING DEVICE, WORK INSTRUCTION CREATING SYSTEM, AND WORK INSTRUCTION CREATING METHOD

(71) Applicant: Fanuc Corporation, Yamanashi (JP)

(72) Inventor: Yuuji Kounosu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 45 days.

(21) Appl. No.: 17/908,097

(22) PCT Filed: Mar. 1, 2021

(86) PCT No.: PCT/JP2021/007765
§ 371 (c)(1),
(2) Date: Aug. 30, 2022

(87) PCT Pub. No.: WO2021/177245
PCT Pub. Date: Sep. 10, 2021

(65) Prior Publication Data
US 2023/0360193 A1 Nov. 9, 2023

(30) Foreign Application Priority Data
Mar. 5, 2020 (JP) ................................. 2020-038065

(51) Int. Cl.
*G06T 7/70* (2017.01)
*G06T 7/00* (2017.01)
*H04N 23/695* (2023.01)

(52) U.S. Cl.
CPC ................ *G06T 7/001* (2013.01); *G06T 7/70* (2017.01); *H04N 23/695* (2023.01);
(Continued)

(58) Field of Classification Search
CPC ............ G06N 3/08; G06N 5/04; G06N 20/00; G06N 20/20; G06Q 10/063; G06Q 50/04;
(Continued)

(56) References Cited

U.S. PATENT DOCUMENTS 9,329,585 B2 * 5/2016 Furuya .................. B25J 9/1687
9,805,459 B2 * 10/2017 Nakamura ............ G06T 7/0006
(Continued)

FOREIGN PATENT DOCUMENTS

JP 07108426 A 4/1995
JP 2009037392 A * 2/2009
(Continued)

OTHER PUBLICATIONS

International Search Report and Written Opinion for International Application No. PCT/JP2021/007765, dated May 25, 2021, 5 pages.

*Primary Examiner* — Masum Billah
(74) *Attorney, Agent, or Firm* — Buchanan Ingersoll & Rooney PC (57) ABSTRACT

An image processing device is provided with: a work target object detecting unit which employs first machine learning to analyze a first image captured using a first angle of view in such a way as to include the work target object, to detect the position of the work target object in the first image; a work status detecting unit which, on the basis of the detected position of the work target object, employs second machine learning to analyze a second image captured using a second angle of view narrower than the first angle of view in such a way as to include the work target object, to detect the work status of the work target object; and a work instruction creating unit which, on the basis of the detected work status, creates work instruction information indicating the content of a work instruction with respect to the work target object.

7 Claims, 9 Drawing Sheets

(52) U.S. Cl.
CPC ............... *G06T 2207/20081* (2013.01); *G06T 2207/20084* (2013.01); *G06T 2207/30164* (2013.01)

(58) Field of Classification Search
CPC . G06T 2207/10016; G06T 2207/20081; G06T 2207/20084; G06T 2207/30164; G06T 7/0004; G06T 7/001; G06T 7/70
USPC .......................................................... 348/143
See application file for complete search history.

(56) References Cited

U.S. PATENT DOCUMENTS

| | | | |
|---|---|---|---|
| 11,010,609 B2 | 5/2021 | Shintani et al. | |
| 11,216,757 B2 | 1/2022 | Shiraishi | |
| 2015/0019011 A1* | 1/2015 | Namba | B25J 9/0084 |
| | | | 700/264 |
| 2021/0131690 A1 | 5/2021 | Suzuki et al. | |

FOREIGN PATENT DOCUMENTS

| | | | |
|---|---|---|---|
| JP | 2009037392 A | 2/2009 | |
| JP | 2018149677 A | 9/2018 | |
| JP | 2018207360 A | 12/2018 | |
| JP | 2019039656 A | 3/2019 | |
| JP | 2019101516 A | 6/2019 | |
| JP | 2019161606 A | 9/2019 | |

* cited by examiner

IMAGE PROCESSING DEVICE, WORK INSTRUCTION CREATING SYSTEM, AND WORK INSTRUCTION CREATING METHOD

CROSS REFERENCE TO RELATED APPLICATIONS

This is the U.S. National Phase application of PCT/JP2021/007765, filed Mar. 1, 2021, which claims priority to Japanese Patent Application No. 2020-038065, filed Mar. 5, 2020, the disclosures of these applications being incorporated herein by reference in their entireties for all purposes.

FIELD OF THE INVENTION

The present invention relates to an image processing device, a work instruction creating system, and a work instruction creating method.

BACKGROUND OF THE INVENTION

Conventionally, an imaging target is observed by a stationary camera, and the state of the imaging target is confirmed. For example, PTL 1 describes an "air processing apparatus comprising a casing, a structural part detachably provided on a main body of the casing, and an imaging device that acquires image data of a predetermined imaging target in an inside of the case, wherein the imaging device is supported on the structural part in such a position as to be capable of imaging the imaging target" (claim 1).

PATENT LITERATURE

[PTL 1] Japanese Unexamined Patent Publication (Kokai) No. 2019-39656

SUMMARY OF THE INVENTION

In order to confirm a work condition by analyzing an image of a camera in a process of a manual work, or to create a work instruction from the work condition, strict positioning of a work target is necessary. However, the strict positioning of the work target is an obstacle to introducing a system for analyzing a work condition with use of a camera, since the strict positioning hinders a worker's work or requires a purpose-specific fixing tool for the positioning of the work target. In addition, even when a work target is strictly positioned, there is a case in which image analysis is difficult due to an individual difference of the work target (for example, an individual difference of a mounting position of parts on a printed board). Besides, depending on work targets, there is a work target the external appearance of which may not be fixed (for example, a positional attitude of each axis of an industrial robot as a work target).

According to one mode of the present disclosure, an image processing device includes a work target detection unit configured to analyze, by first machine learning, a first image captured at a first view angle in such a manner as to include a work target, and detects a position of the work target in the first image; a work condition detection unit configured to analyze, by second machine learning, a second image captured at a second view angle narrower than the first view angle in such a manner as to include the work target, based on the detected position of the work target, and detects a work state of the work target; and a work instruction creation unit configured to generate work instruction information indicative of a work instruction content on the work target, based on the detected work state.

According to another mode of the present disclosure, a work instruction creating system includes the above-described image processing device; an imaging device that includes pan, tilt and zoom functions; and an output device, wherein the work target detection unit acquires the first image by causing the imaging device to photograph the work target at the first view angle, the work condition detection unit acquires the second image by causing the imaging device to photograph the work target at the second view angle, by controlling the pan, tilt and zoom functions of the imaging device, based on the position of the work target detected by the work target detection unit, and the work instruction creation unit outputs the work instruction information to the output device.

According to still another mode of the present disclosure, a work instruction creating method includes acquiring a first image by photographing a work target at a first view angle in which the work target is included; analyzing the first image by first machine learning, and detecting a position of the work target in the first image; acquiring a second image by photographing the work target at a second view angle narrower than the first view angle in such a manner as to include the work target, based on the detected position of the work target; analyzing the second image by second machine learning, and detecting a work state of the work target; and generating work instruction information indicative of a work instruction content on the work target, based on the detected work state, and outputs the work instruction information to an output device.

According to the above configuration, confirmation of a work state and creation of a work instruction based on the confirmation of the work state can exactly be performed, even in such a situation that a work target may not strictly be positioned, an individual difference is present in regard to a work target, or an external appearance of a work target may not be fixed.

From a detailed description of typical embodiments of the present invention illustrated in the accompanying drawings, the objects, features and advantageous effects of the present invention, and other objects, features and advantageous effects of the invention, will be clearer.

DETAILED DESCRIPTION OF EMBODIMENTS OF THE INVENTION

Next, embodiments of the present disclosure will be described with reference to the accompanying drawings. In the drawings to be referred to, similar structural parts or functional parts are denoted by the same reference numerals. These drawings use different scales as appropriate to facilitate understanding. The mode illustrated in each drawing is one example for carrying out the present invention, and the present invention is not limited to the modes illustrated in the drawings.

Figure 1:
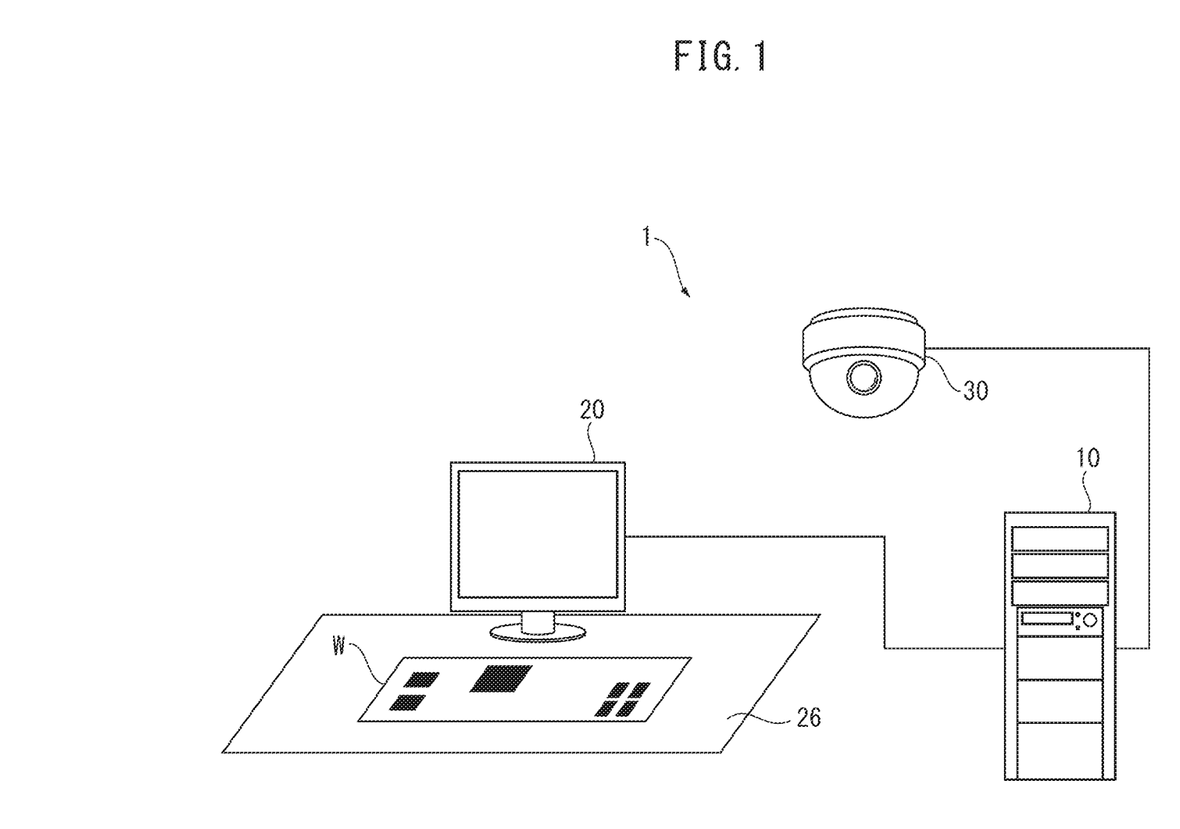
FIG. 1 is a system configuration diagram of a work instruction creating system including an image processing device according to the present embodiment.

FIG. 1 is a system configuration diagram of a work instruction creating system 1 including an image processing device 10 according to the present embodiment. As illustrated in FIG. 1, the work instruction creating system 1 includes the image processing device 10, an output device 20, and an imaging device 30 including pan, tilt and zoom functions. The work instruction creating system 1 is configured to confirm, without requiring strict positioning of a work target (hereinafter referred to as "work") W, a work state on the work W by analyzing an image of the work target W acquired by the imaging device 30, and to give a work instruction to a worker via the output device 20.

The image processing device 10 may include a configuration as a general computer including a CPU, a ROM, a RAM, a storage device, an operation unit, an input/output interface, a network interface, and the like. Various devices, such as a display device, a sound output device and a printing device, can be used as the output device 20 as a device that outputs a work instruction to a worker. In the present embodiment, it is assumed that a display monitor is used as the output device 20. The output device 20 is disposed on a work table 26, and displays a work instruction that is to be executed on the work target W. It suffices that the imaging device 30 is disposed in such a position as to capable of imaging the work W in a work space in which the work table 26 is disposed.

Figure 2:
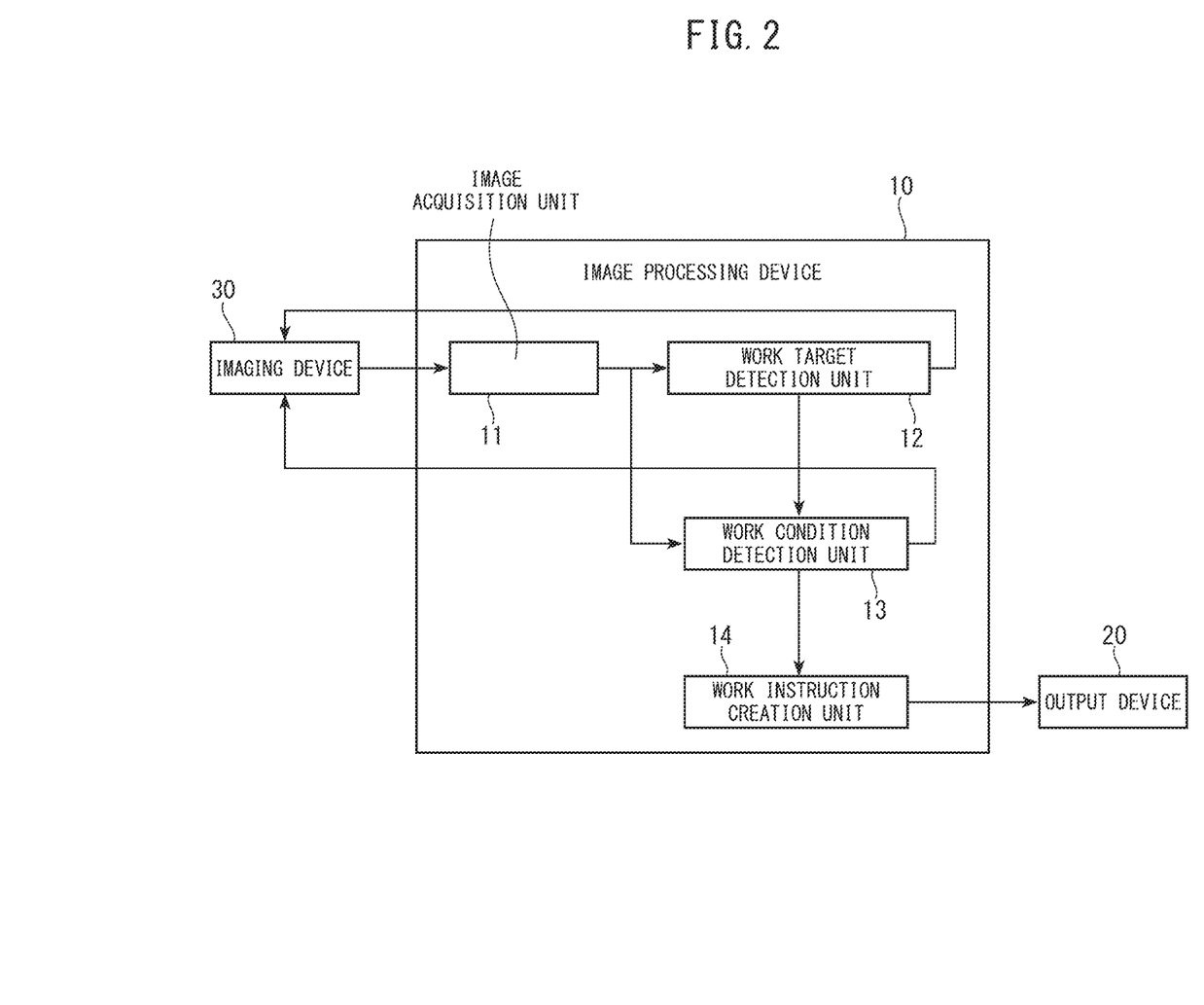
FIG. 2 is a functional block diagram of the image processing device.

FIG. 2 is a functional block diagram of the image processing device 10. As illustrated in FIG. 2, the image processing device 10 includes an image acquisition unit 11, a work target detection unit 12, a work condition detection unit 13, and a work instruction creation unit 14. The image acquisition unit 11 acquires an image captured by the imaging device 30. The work target detection unit 12 analyzes, by first machine learning, a first image captured at a first view angle (wide angle) in such a manner as to include the work W, and detects the position of the work W in the first image.

The work condition detection unit 13 analyzes, by second machine learning, a second image captured at a second view angle (on a telephotography side) narrower than the first view angle in such a manner as to include the work W (for example, in such a manner that the work W is located near the center of the image), based on the position of the work W detected by the work target detection unit 12, and detects the work state of the work W. The work instruction creation unit 14 generates work instruction information indicative of a work instruction content on the work W, based on the detected work state, and causes the output device 20 to output the work instruction information.

In this manner, the image processing device 10 of the present embodiment first specifies the position of the work in the image by analyzing the image captured by photographing the work space at a wide angle, and then photographs the work by telephotography, for example, such that the work is located at the center of the image, based on the specified position of the work W. Further, the image processing device 10 confirms the work condition on the work by analyzing the image of the work that is photographed in enlarged scale by telephotography, and generates the work instruction information. By this configuration, there is no need to strictly position the work in order to confirm the work condition by a camera.

Figure 3A:
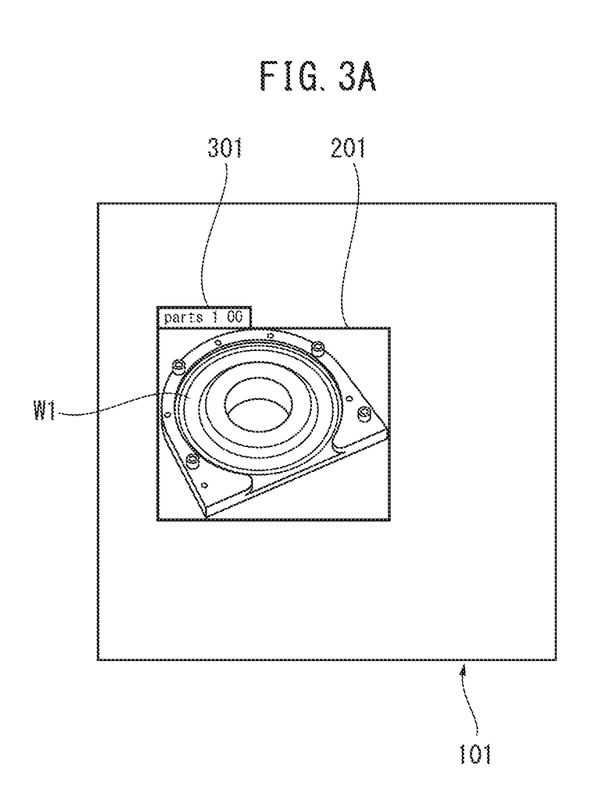
FIG. 3A is a view illustrating an example in which a work is detected from an image captured by photographing the work at a wide angle.

Hereinafter, the details of the operation of the image processing device 10 are described by taking as an example of a work content the case of screw fastening on a work. FIG. 3A illustrates an image 101 captured by photographing a work space including a work W1 at a wide angle with the imaging device 30. In order to capture a wide-angle image of the work W1, the work target detection unit 12 may control the pan, tilt and zoom functions of the imaging device 30 by using disposition information of the work W1 in the work space and disposition information of the imaging device 30 in the work space. The work target detection unit 12 acquires the image 101 via the image acquisition unit 11.

The work target detection unit 12 includes a function of performing machine learning, and detects the position of the work W1 by analyzing the image 101 by machine learning (first machine learning). In FIG. 3A, as an object detection result by machine learning, a box line (bounding box) 201 indicative of an area of the work W1, and a label 301 indicative of the object detection result are displayed. The label 301 indicative of the detection result includes parts ("parts") that are a result of category classification, and the probability "1.00" thereof. The work target detection unit 12 may cause the output device 20 to display an image in which the object detection result is superimposed on the image 101.

Figure 3B:
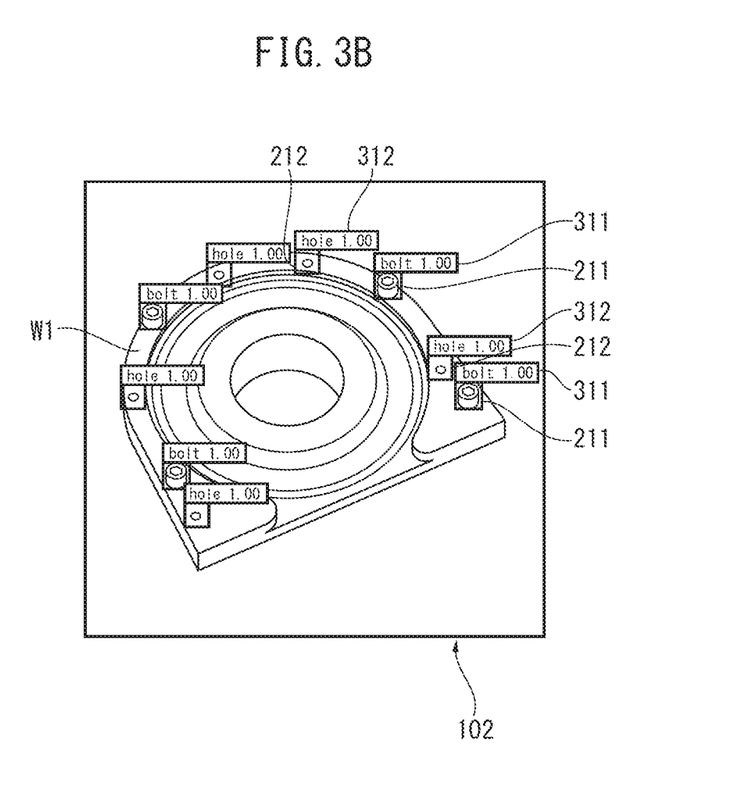
FIG. 3B is view illustrating an example in which a work state of a work is detected from an image captured by photographing the work of FIG. 3A by telephotography.

Next, the work condition detection unit 13 causes the imaging device 30 to photograph the work W1 by telephotography, for example, such that the work W1 appears at the center of the image, by controlling the pan, tilt and zoom functions of the imaging device 30, based on the position of the work W1 detected by the work target detection unit 12. FIG. 3B illustrates an image 102 of the work W1 captured by the imaging device 30 by telephotography such that the work W1 appears at the center of the image. In addition, the work condition detection unit 13 detects the positions of bolts and holes for fastening the bolts on the work W1, by analyzing the image 102 by machine learning (second machine learning).

In the image 102, as an object detection result by machine learning, bounding boxes 211 indicative of areas of bolts, labels 311 indicative of results of category classification thereof, bounding boxes 212 indicative of area of holes, and labels 312 indicative of results of category classification thereof are displayed (only some of these are denoted by reference signs). The work condition detection unit 13 may cause the output device 20 to display the image in which the object detection result is superimposed on the image 102.

In the present embodiment, an object detection algorithm using deep learning, concretely, a convolutional neural network (CNN), is used for the detection of an object in the image. In general, the object detection algorithm includes tasks:

(1) Extraction of an area (called "bounding box") including an object;
(2) Arithmetic operation of CNN features of the area; and
(3) Category classification of the area and regression of an exact position.

Figure 6:
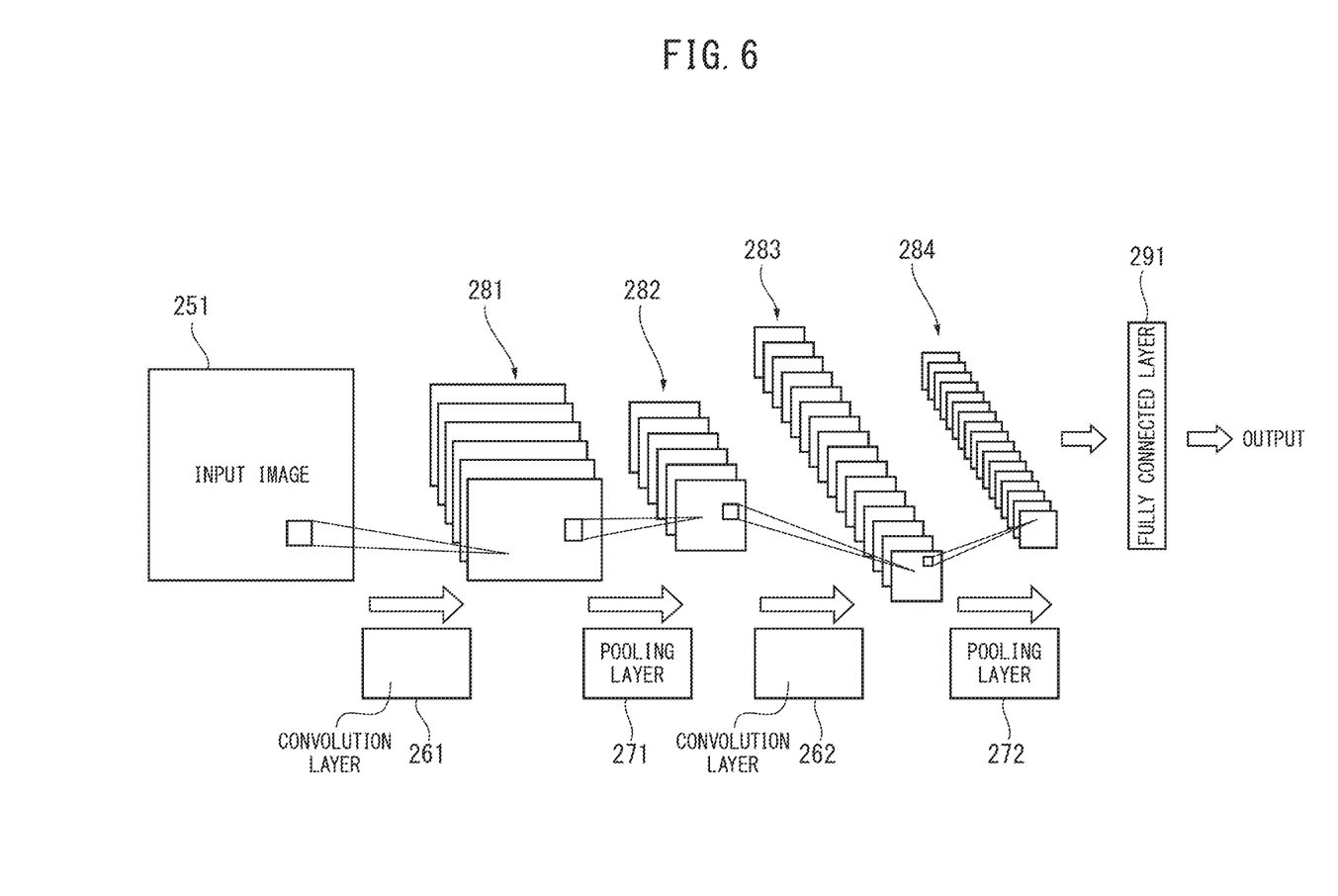
FIG. 6 is a view representing a configuration example of a convolutional neural network.

FIG. 6 illustrates a basic configuration of the CNN used in the object detection algorithm. As illustrated in FIG. 6, the CNN includes a combination of a convolution layer 261, 262 that performs a convolution operation by applying a filter (kernel) to an input image 251, and a pooling layer 271, 272 that performs down-sampling. In the example illustrated in FIG. 6, a state is illustrated in which feature maps 281, 282, 283 and 284 are generated in stages by stacking two convolution layers and two pooling layers. The category classification or the regression of the position of the bounding box are executed by applying a fully connected layer 291 as an output layer to the feature map obtained by the CNN.

The convolution operation in the convolution layer 261, 262 corresponds to a process of performing forward propagation expressed by an equation below in units of a channel number of filters (kernels).

$$z = h\left(\sum_i w_i x_i + b\right)$$ [Math. 1]

Here, z is an output of a convolution layer unit, $w_i$ is a weight parameter of the filter, $x_i$ is an input (local area), h is an activation function, and b is a bias. As the activation function h, for example, a logistic sigmoid function, a ReLU (Rectified Linear Unit), or the like can be used.

As the arithmetic operation in the pooling layer 271, 272, for example, use can be made of a maximum value pooling that outputs a maximum value in input data, or an average value pooling that outputs an average value of input data.

In a learning stage of machine learning of object detection using the CNN, an input image, and a bounding box and an object category of a correct answer to the input image, are given. In addition, a parameter, which minimizes a loss defined by a loss function between the output obtained from the input image and the correct answer, is learned by an error backpropagation method.

As object detection algorithms using the above-described CNN, region with CNN features (RCNN), you only look once (YOLO), single shot multibox detector (SSD) and the like are known in the field. Among these, RCNN belongs to an approach that first extracts an area candidate by using a selective searching method and then applies CNN to the extracted area, and YOLO and SSD belong to an approach that executes at a time the estimation of the likelihood of an object and the position of the bounding box by the CNN.

In the present embodiment, aside from the above-described example, various object detection methods by machine learning can be used.

In the stage of learning in the work condition detection unit 13, learning has been executed by giving the image of the work W1 as exemplarily illustrated in FIG. 3A, and the area (bounding box) of the work W1 and the category of the object as the correct answer. In the stage of learning in the work condition detection unit 13, learning has been performed by giving the image of the work W1 as exemplarily illustrated in FIG. 3B, the area (bounding box) of the bolt and the object category as the correct answer, and the area (bounding box) of the hole and the object category as the correct answer.

Figure 4A:
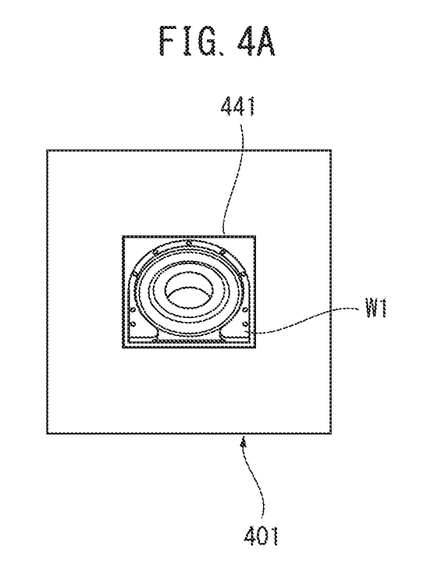
FIG. 4A is a view illustrating an example in which a work is detected from an image captured by photographing a work at a wide angle.

Next, the details of the work instruction creation by the work instruction creation unit 14 are described. A first example of the work instruction creation is described. As illustrated in FIG. 4A, it is assumed that the position of the work W1 is detected by the work target detection unit 12 analyzing the image 401 including the work W1 photographed by the imaging device 30 at a wide angle. FIG. 4A also illustrates a bounding box 441 as a detection result of the work W1 by the work target detection unit 12. Next, the work condition detection unit 13 detects bolts and holes on the work W1 by analyzing an image 402 (FIG. 4B) captured by telephotography in such a manner as to include the work W1. In this case, since the work W1 is in the state in which bolts are yet to be fastened, the work condition detection unit 13 detects nine holes h (only some of the holes are denoted by h) and the position thereof on the work W1.

Figure 4B:
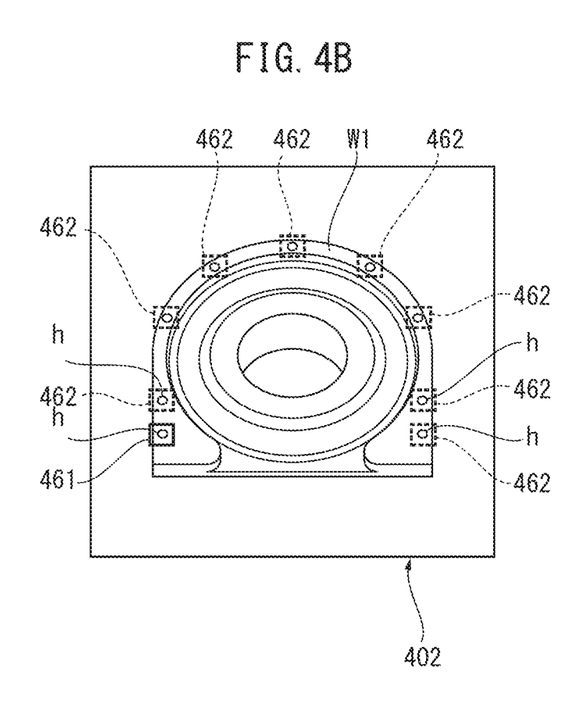
FIG. 4B is view illustrating an example in which a work instruction on the work is created from an image captured by photographing the work of FIG. 4A by telephotography, and the work instruction is displayed.

Next, the work instruction creation unit 14 compares the detection result (the fastening state of bolts) by the work condition detection unit 13 and work content information stored in advance. It is assumed that the work content information is "to fasten bolts in all holes clockwise in order from a lower left hole" when the work W1 is viewed as in FIG. 4B. The work instruction creation unit 14 creates an instruction to fasten a bolt in the lower left hole, by comparing the information acquired from the work condition detection unit 13 (the state in which bolts are yet to be fastened in nine holes) and the above-described work content information. FIG. 4B represents an example of such an instruction. As illustrated in FIG. 4B, the work instruction creation unit 14 makes it possible to visually recognize that a fastening instruction is given in regard to the lower left hole h surrounded by a box line 461, by making the display color of the rectangular box line 461 surrounding the lower left hole h, in which bolt fastening is to be next performed, different from the display color of rectangular box lines 462 surrounding the other holes h. The work instruction creation unit 14 causes the output device 20 to display the image 402 in which the box lines 461 and 462 indicating the work instruction in this manner are superimposed.

When it is necessary to recognize the positions of the holes h with reference to the work W1 in order to create the work instruction, the work instruction creation unit 14 can specify the positions of the holes h with reference to the work W1 by the following methods.

(1) To specify the positions of the holes h with reference to the work W1 by estimating the geometrical center of the work W1, based on the arrangement of the holes h (an arrangement of an inverted-U shape in this case) in the image 402 detected by the work condition detection unit 13.

(2) To specify the positions of the holes h with reference to the work W1, based on the position of the work W1 in the image 401 detected by the work target detection unit 12, the positions of the holes h in the image 402 detected by the work condition detection unit 13, and information indicative of how the pan, tilt and zoom functions are controlled in order to acquire the image 402.

Figure 5A:
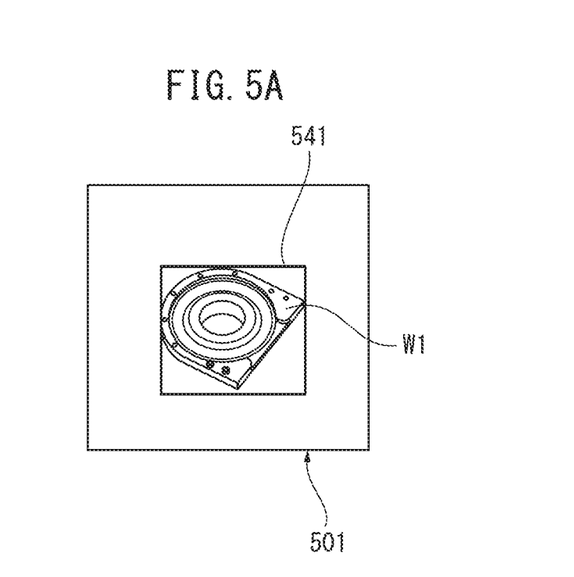
FIG. 5A is a view illustrating an example in which a work is detected from an image captured by photographing a work at a wide angle.

A second example of the work instruction creation is described. As illustrated in FIG. 5A, it is assumed that the position of the work W1 is detected by the work target detection unit 12 analyzing an image 501 including the work W1 photographed by the imaging device 30 at a wide angle. FIG. 5A also illustrates a bounding box 541 as a detection result of the work W1 by the work target detection unit 12. Next, the work condition detection unit 13 detects bolts and holes on the work W1 by analyzing an image 502 (FIG. 5B) captured by telephotography in such a manner as to include the work W1. In this case, because of the state in which bolts have been fastened in two lower left holes among nine holes of the work W1, the work condition detection unit 13 detects two bolts b at two lower left positions among the positions of the nine holes of the work W1, and detects holes h at the other seven positions.

Figure 5B:
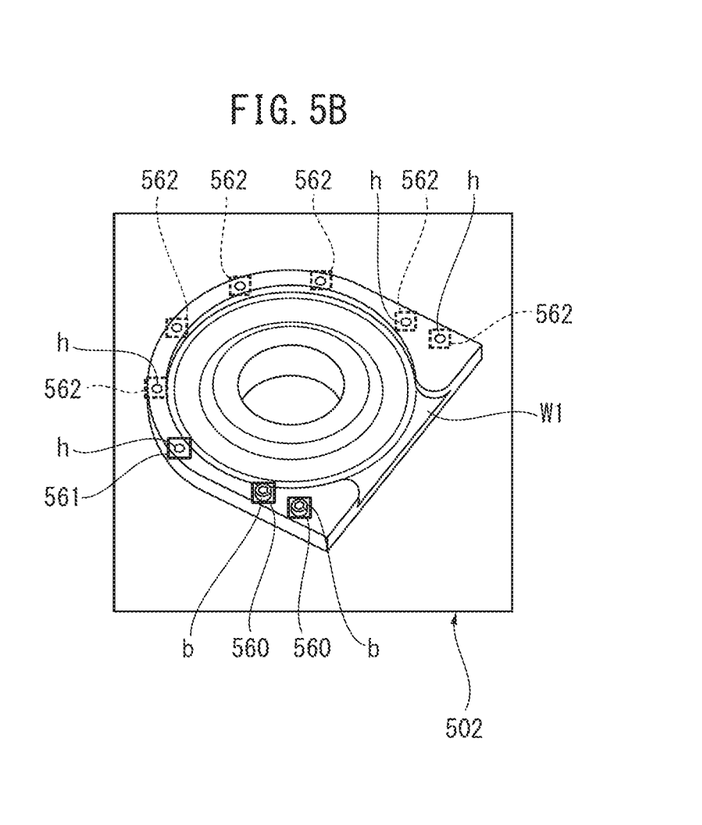
FIG. 5B is view illustrating an example in which a work instruction on the work is created from an image captured by photographing the work of FIG. 5A by telephotography, and the work instruction is displayed.

Next, the work instruction creation unit 14 compares the detection result by the work condition detection unit 13 and work content information stored in advance. It is assumed that the work content information is the same as in the above-described case of FIG. 4B. The work instruction creation unit 14 creates an instruction to fasten a bolt in a third hole from the lower left, by comparing the information acquired from the work condition detection unit 13 (bolts are fastened in two lower left holes among nine holes) and the above-described work content information. FIG. 5B represents an example of such an instruction. As illustrated in FIG. 5B, the work instruction creation unit 14 makes it possible to visually recognize that a fastening instruction is given in regard to the hole h surrounded by a box line 561, by making the display color of the rectangular box line 561 surrounding the third hole h from the lower left, in which bolt fastening is to be next performed, different from the display color of rectangular box lines 562 surrounding the other holes h. Besides, as regards box lines 560 surrounding the positions where the bolts b have been fastened, the work instruction creation unit 14 may indicate the completion of fastening by using a display color for the box lines 560, which is different from the display colors of the box lines 561 and 562. The work instruction creation unit 14 causes the output device 20 to display an image 502 in which the box lines 560 to 562 indicating the work instruction in this manner are superimposed.

Figure 7:
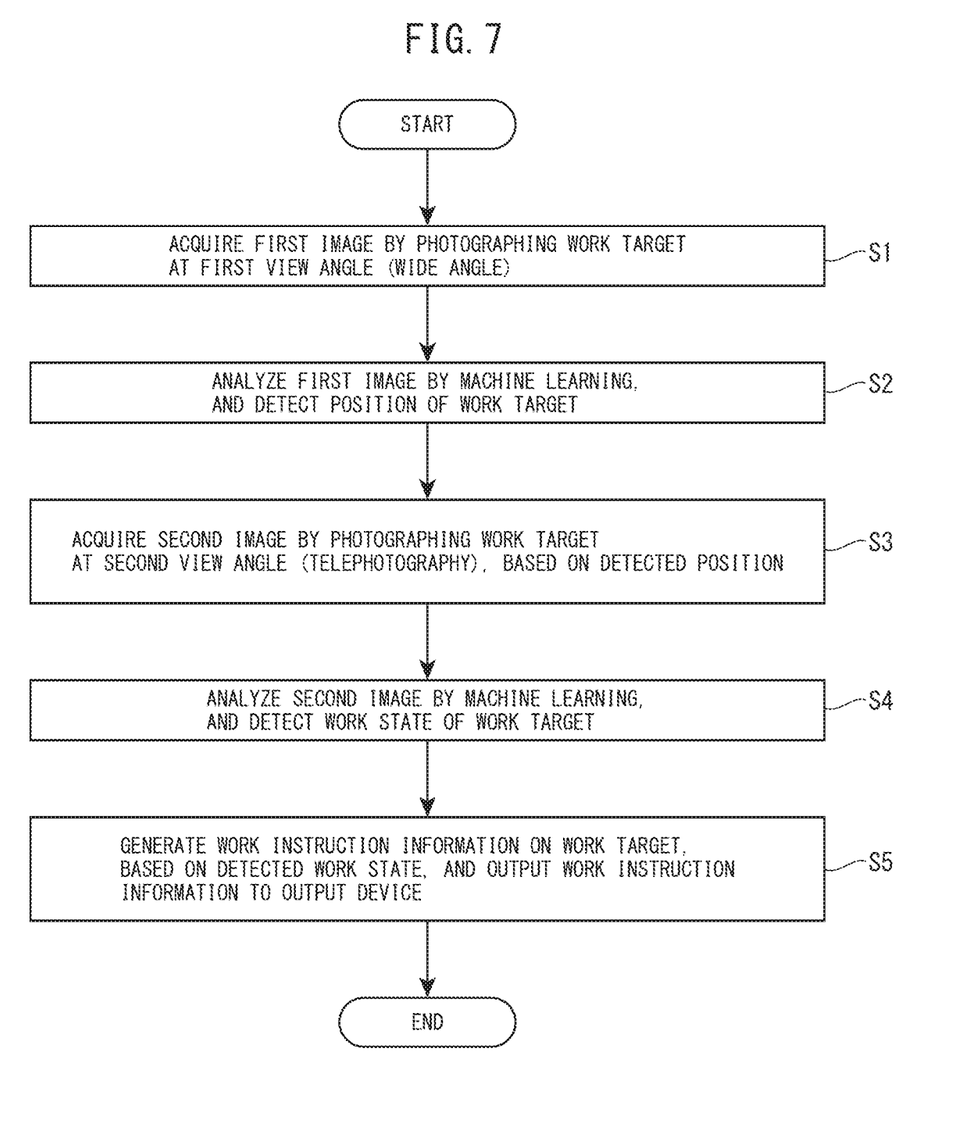
FIG. 7 is a flowchart representing a work instruction creation process.

FIG. 7 represents, as a flowchart, a work instruction creating process (work instruction creating method) by the image processing device 10. To start with, the image processing device 10 (work target detection unit 12) acquires a first image captured by the imaging device 30 at a wide angle (first view angle) (step S1). Next, the work target detection unit 12 analyzes the first image by machine learning (first machine learning), and detects the position of the work target (step S2). Subsequently, the work condition detection unit 13 acquires a second image captured by photographing the work target by telephotography (second view angle), for example, in such a manner that the work target appears at the center, based on the position of the work target detected by the work target detection unit 12 (step S3).

Next, the work condition detection unit 13 analyzes the second image by machine learning (second machine learning), and confirms the work state of the work target (step S4). Subsequently, the work instruction creation unit 14 creates a work instruction on the work target, based on the work state detected by the work condition detection unit 13, and outputs the work instruction to the output device 20 (step S5).

Figure 8:
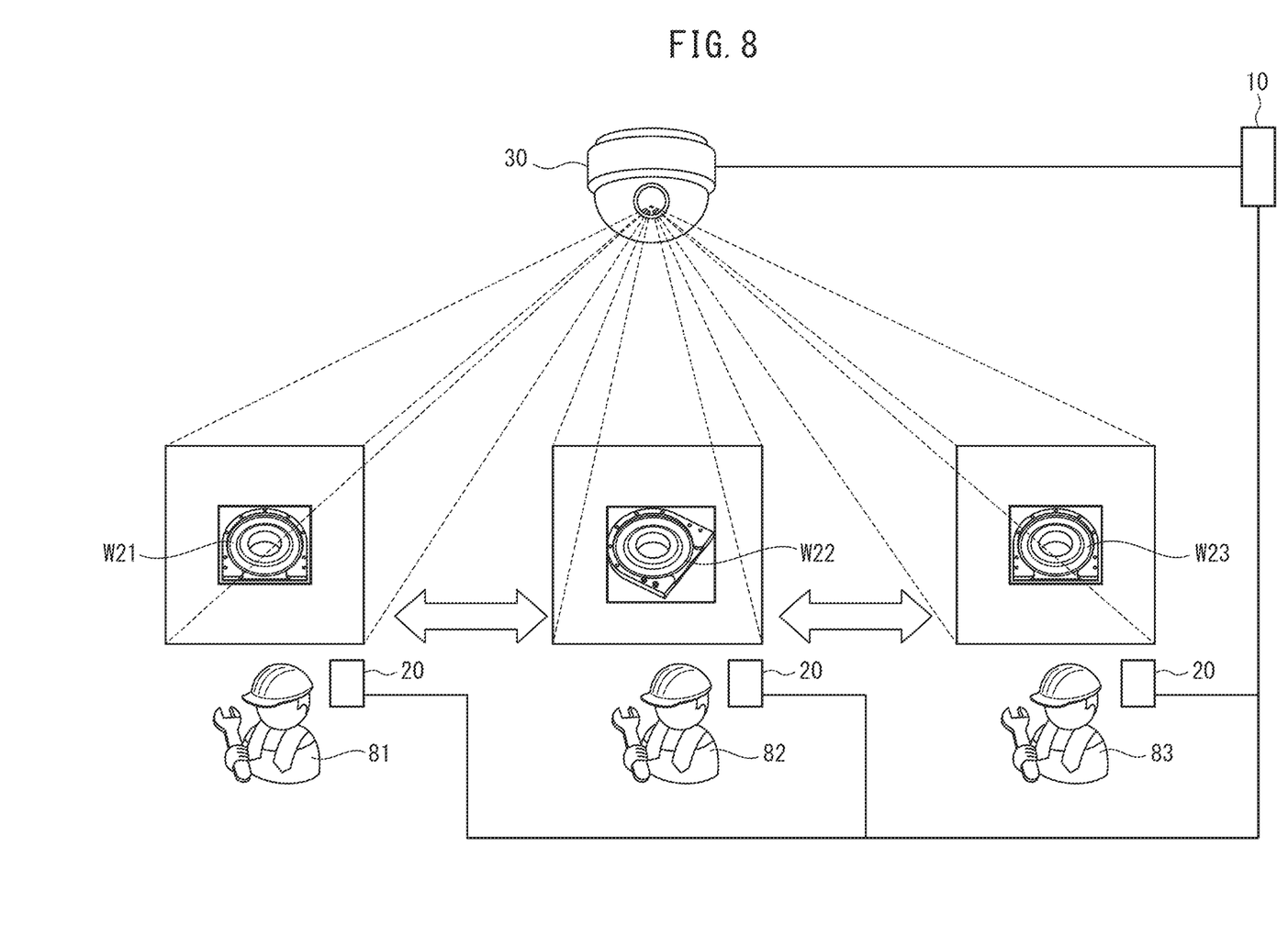
FIG. 8 is a view illustrating a configuration of a work instruction creating system configured to give work instructions on works placed on a plurality of work sites.

In an actual work site, a situation is assumed in which work processes are performed in parallel by a plurality of workers. As illustrated in FIG. 8, a situation is assumed in which three workers 81, 82 and 83 perform works, respectively. In this case, the work instruction creating system 1 having the configuration illustrated in FIG. 1 is configured such that a plurality of output devices 20 are connected to the image processing device 10. The output devices 20 are disposed at positions of the workers 81 to 83, respectively. For example, in a periodically circulating manner, or in accordance with an event on the worker side (for example, a signal indicative of completion of work), the image processing device 10 confirm the work conditions of the workers 81 to 83 and gives work instructions.

Specifically, in this case, arrangement position information of works W21 to W23 in the work space (or arrangement position information of work sites of the workers 81, 82 and 83), and arrangement position information of the imaging device 30 in the work space are stored in the work target detection unit 12. An operation of confirming the work conditions of the workers 81 to 83 in a circulating manner is assumed. To start with, the work target detection unit 12 pans and tilts the imaging device 30, based on the arrangement position information of the work W21 and the arrangement position information of the imaging device 30, photographs the work W21 that is the work target of the worker 81 at a wide angle, and detects the position of the work W21 in the image. Then, the work condition detection unit 13 confirms the work condition on the work W21 by the worker 81. By comparing the work condition of the work W21 and the work content information of the work W21, which is stored in advance, the work instruction creation unit 14 creates a work instruction to the worker 81, and outputs the work instruction to the output device 20 at the position of the worker 81. As regards the workers 82 and 83, too, the creation and output of work instructions are successively performed by similar operations.

The operation example in which the work condition is confirmed in the form of periodically circulating among the workers 81 to 83 has been described here. However, for example, by adopting such a configuration that when each worker uses an automatic fastening device, a signal indicative of the completion of a screw fastening operation is transmitted from the automatic fastening device to the image processing device 10, a configuration can be constituted in which a next work instruction is given after confirming the work condition in accordance with the coming of the signal indicative of the completion of the screw fastening from the workers 81 to 83 side. According to the above configuration, even in such a situation that three stationary cameras are needed for three workers in the conventional configuration, work instructions can be given to three workers with one imaging device 30.

As described above, according to the present embodiment, confirmation of a work state and creation of a work instruction based on the confirmation of the work state can exactly be performed, even in such a situation that a work target may not strictly be positioned, an individual difference is present in regard to a work target, or an external appearance of a work target may not be fixed.

The present invention has been described above by using typical embodiments. It can be understood, however, that a person skilled in the art can make changes, various other modifications, omissions and additions to the above-described embodiments, without departing from the scope of the present invention.

In the above embodiments, the example was described in which the content of the work confirmation is the confirmation of the fastening state of the bolt of the work. However, the content of the work confirmation may include various works, the work conditions of which can be confirmed by image analysis, such as confirmation of a mounting state of parts of a printed board, confirmation of an assembly condition in regard to an industrial robot, confirmation of a deburring state in deburring work, and confirmation of a work state in polishing work.

The functional blocks of the image processing device 10 illustrated in FIG. 2 may be implemented by the execution of various kinds of software stored in a storage device by the CPU of the image processing device 10, or may be implemented by a configuration constituted mainly by hardware such as an application specific integrated IC (ASIC).

A program that executes various processes such as the work instruction creating process in the above embodiment can be stored in various computer-readable storage media (for example, a semiconductor memory such as a ROM, an EEPROM or a flash memory, a magnetic storage medium, or an optical disc such as a CD-ROM or a DVD ROM).

REFERENCE SIGNS LIST

1 Work instruction creating system
10 Image processing device
11 Image acquisition unit
12 Work target detection unit
13 Work condition detection unit
14 Work instruction creation unit
20 Output device
26 Work table
30 Imaging device

The invention claimed is:

1. An image processing device comprising:
a processor figured to:
analyze, by first machine learning, a first image captured at a first view angle in such a manner as to include a work target, and detect a position of the work target in the first image;
analyze, by second machine learning, a second image captured at a second view angle narrower than the first view angle in such a manner as to include the work target, based on the detected position of the work target, and detect a work state of the work target; and
generate a work instruction containing information indicative of a work for an object on the work target, based on a comparison of the detected work state and predetermined information of the object with reference to the work target.

2. The image processing device according to claim 1, wherein the processor detects positions of a bolt and a hole for bolt fastening on the work target in the second image by the second machine learning, thereby detecting a fastening state of the bolt to the work target as the work state.

3. The image processing device according to claim 2, wherein the processor generates, as the work instruction, information that instructs bolt fastening to the hole.

4. A work instruction creating system comprising:
the image processing device according to claim 1;
an imaging device that includes pan, tilt and zoom functions; and
an output device, wherein the processor of the image processing device:
acquires the first image by causing the imaging device to photograph the work target at the first view angle,
acquires the second image by causing the imaging device to photograph the work target at the second view angle, by controlling the pan, tilt and zoom functions of the imaging device, based on the detected position of the work target, and
outputs the work instruction to the output device.

5. The work instruction creating system according to claim 4, wherein
the work instruction creating system comprises a plurality of the output devices arranged in a plurality of work sites in a work space,
a plurality of the work targets are arranged in the work sites, respectively,
the processor of the image processing device causes the imaging device to capture the first image in regard to each of the work targets by controlling the pan, tilt and zoom functions of the imaging device, based on arrangement position information of the work targets in the work space and arrangement position information of the imaging device in the work space, thereby detecting the position in the first image in regard to each of the work targets,
the processor of the image processing device causes the imaging device to capture the second image in regard to each of the work targets by controlling the pan, tilt and zoom functions of the imaging device, based on the detected position in the first image in regard to each of the work targets, thereby detecting the work state in regard to each of the work targets, and
the processor of the image processing device generates the work instruction on each of the work targets, based on the detected work state of each of the work targets, and outputs the work instruction information to each of the output devices.

6. The work instruction creating system according to claim 5, wherein the processor of the image processing device detects the position in the first image in regard to each of the work targets, by causing the imaging device to capture the first image in regard to each of the work targets in a periodically circulating form.

7. A work instruction creating method comprising:
acquiring a first image by photographing a work target at a first view angle in which the work target is included;
analyzing the first image by first machine learning, and detecting a position of the work target in the first image;
acquiring a second image by photographing the work target at a second view angle narrower than the first view angle in such a manner as to include the work target, based on the detected position of the work target;
analyzing the second image by second machine learning, and detecting a work state of the work target; and
generating a work instruction containing information indicative of a work for an object on the work target, based on a comparison of the detected work state and predetermined information of the of reference to the work target, and outputting the work instruction to an output device.

* * * * *

UNITED STATES PATENT AND TRADEMARK OFFICE
CERTIFICATE OF CORRECTION

PATENT NO. : 12,056,868 B2
APPLICATION NO. : 17/908097
DATED : August 6, 2024
INVENTOR(S) : Yuuji Kounosu It is certified that error appears in the above-identified patent and that said Letters Patent is hereby corrected as shown below:

In the Claims

In Column 9, Line 29, Claim 1: "figured" should be -- configured --.

In Column 10, Line 56, Claim 7: "of the of" should be -- of the object with --.

Signed and Sealed this
Twelfth Day of November, 2024

Katherine Kelly Vidal
*Director of the United States Patent and Trademark Office*